United States Patent
Kim et al.

(10) Patent No.: US 7,559,492 B2
(45) Date of Patent: Jul. 14, 2009

(54) FINE POWDER OF WASTE POLYURETHANE FOAM AND METHOD OF MANUFACTURING THE SAME

(75) Inventors: Jin-Kuk Kim, Gyeongsangnam-do (KR); Kyum-Woo Choi, Busan (KR)

(73) Assignee: Industry-Academic Cooperation Foundation Gyeongsang National University, Gyeongsangnam-do (KR)

( * ) Notice: Subject to any disclaimer, the term of this patent is extended or adjusted under 35 U.S.C. 154(b) by 5 days.

(21) Appl. No.: 11/600,184

(22) Filed: Nov. 16, 2006

(65) Prior Publication Data

US 2008/0116304 A1    May 22, 2008

(51) Int. Cl.
*B02C 19/00* (2006.01)
(52) U.S. Cl. .................. 241/5; 241/19; 241/29
(58) Field of Classification Search .......... 241/24.28, 241/29, 19, 5, 152.2, 79.1; 264/37.1
See application file for complete search history.

(56) References Cited

U.S. PATENT DOCUMENTS

| 3,006,561 | A | * | 10/1961 | Eberl et al. ............. 241/29 |
| 5,669,559 | A | * | 9/1997 | Wagner et al. ........... 241/23 |
| 6,562,879 | B1 | * | 5/2003 | Hatsuda et al. .......... 521/56 |

FOREIGN PATENT DOCUMENTS

KR    10-2006-011039    10/2006

* cited by examiner

*Primary Examiner*—Mark Rosenbaum
(74) *Attorney, Agent, or Firm*—Holland & Knight LLP

(57) ABSTRACT

Disclosed are fine powder of waste polyurethane foam and a manufacturing method thereof. According to this invention, fine powder of waste polyurethane foam can be manufactured using a crushing process including primary and secondary coarse crushing steps and a fine grinding step and a classification process, thereby solving conventional problems of the deterioration of the properties and the difficulty forming a desired cell structure, due to the use of waste polyurethane powder having a large particle diameter, and widening the range of waste polyurethane that can be recycled.

4 Claims, 5 Drawing Sheets waste polyurethane foam primary coarse foam secondary coarse foam fine foam   (x100)

fine foam   (x500)

0 wt% : open cell structure 5 wt% : open cell structure 10 wt% : open cell structure 20 wt% : open cell structure — particle diameter ---- particle diameter distribution

FINE POWDER OF WASTE POLYURETHANE FOAM AND METHOD OF MANUFACTURING THE SAME

BACKGROUND OF THE INVENTION

1. Field of the Invention

The present invention relates to fine powder of waste polyurethane foam and a method of manufacturing the same, and more particularly, to fine powder of waste polyurethane foam, which is manufactured using a crushing process, including primary and secondary coarse crushing steps and a fine grinding step, and a classification process in a physical powdering technique of waste polyurethane among waste polyurethane recycling techniques, and to a method of manufacturing the same.

2. Description of the Related Art

Generally, polyurethane, which is a polymer of an isocyanate group and a hydroxyl compound, has good tensile strength and elasticity and is also superior with respect to abrasion resistance, oil resistance, and solvent resistance, and thus is applied to foam materials, elastic materials, paints, adhesives, fibers, synthetic leather, and sealing agents. Further, as applications thereof, shoes, construction materials, automobile parts, molded products, and furniture are exemplary. Therefore, polyurethane has been produced into products having various properties by controlling the type and proportion of raw material thereof, and the consumption thereof is increasing every year. However, generation of waste is increasing in proportion to the increase in the use of polyurethane, undesirably incurring environmental problems.

Waste disposal methods that have been developed to date include reclamation methods, incineration methods, and recycling methods. Of these methods, the reclamation method and incineration method are problematic in that environmental contamination occurs and economic benefits are negated. Hence, much research effort has been directed toward the recycling method.

Presently, the recycling method is reported to be exemplified by powdering process, thermal utilization process or polymer regeneration process. Among these, the thermal utilization process is employed in order to obtain predetermined material using thermal energy resource or through pyrolysis, but suffers because the initial facility cost is very high. The powdering process is performed by subjecting waste to collection, crushing and processing to thus recycle it as filler or material. The polymer regeneration process is performed by decrosslinking the crosslinked polymer to thus use it as recycling resin. However, due to many problems relating to economic and technical properties, despite such effort, it is difficult to further develop the recycling techniques.

In particular, according to the powdering technique among the polyurethane recycling techniques, in the case where waste hard polyurethane is crushed to form powder thereof, a process of finely grinding such polyurethane to a size of less than 50 μm is not yet known. Accordingly, through the present techniques for reusing waste polyurethane, waste polyurethane can only be crushed to a particle diameter of 100 μm or greater. In this case, however, the use of such powder having a large particle diameter undesirably results in problems of drastic deterioration of the properties, such as tensile strength, elongation, and repulsive elasticity, and also difficulty in forming a desired cell structure.

SUMMARY OF THE INVENTION

Accordingly, the present invention has been made keeping in mind the above problems occurring in the prior art, and an object of the present invention is to provide a method of physically powdering waste polyurethane, among various waste polyurethane recycling techniques, in which a crushing process, including primary and secondary coarse crushing steps and a fine grinding step, and a classification process are applied, to thus manufacture fine powder of waste polyurethane foam, thereby solving conventional problems of deterioration of the properties and difficulty in forming the desired cell structure, due to the use of powder having a large particle diameter, and widening the range of waste polyurethane that can be recycled.

In order to accomplish the above object, the present invention provides a method of manufacturing fine powder of waste polyurethane foam, comprising a) a coarse crushing step of crushing waste polyurethane foam, which is cut, to an average size of 2~4 mm using a primary coarse crusher and then to an average size of 150~160 μm using a secondary coarse crusher, and recovering the coarse foam, b) a fine grinding step of loading the recovered foam into a feeder and grinding it to a size of 1~128 μm using a jet mill, thus obtaining fine foam, and c) a classification step of loading the fine foam into a classifier to thus cause passed foam having a particle diameter of 1~45 μm passed through the classifier to be finally packaged, and unpassed foam having a large particle diameter not passed through the classifier to be loaded again into the feeder in b).

As such, the method of the present invention preferably further comprises crushing the coarse foam, which is crushed using the secondary coarse crusher and recovered, using a ball mill, and then recovering it, after a).

In addition, the present invention provides fine powder of waste polyurethane foam, manufactured using the above method.

DESCRIPTION OF THE PREFERRED EMBODIMENTS

Hereinafter, a detailed description will be given of the present invention.

In the present invention, the method of manufacturing fine powder of waste polyurethane foam largely comprises a crushing process and a classification process, the crushing process consisting of primary and secondary coarse crushing steps and a fine grinding step. The process of manufacturing fine powder of waste polyurethane foam, according to the present invention, is illustrated in FIG. 1.

Figure 1:
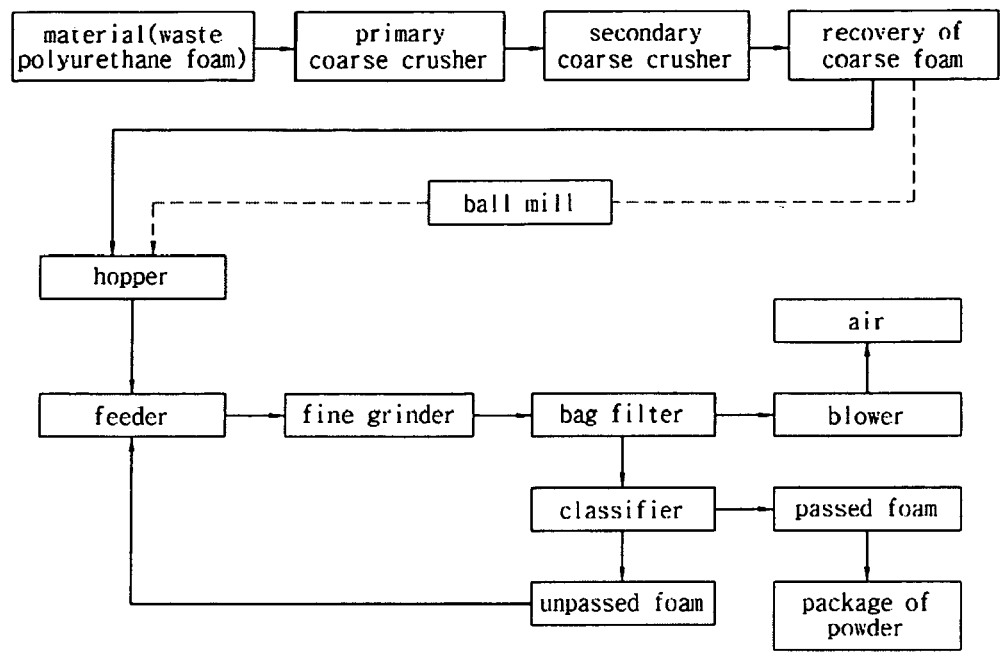
FIG. 1 illustrates the process of manufacturing fine powder of waste polyurethane foam, according to the present invention.

As in FIG. 1, waste polyurethane foam is collected and cut. Preferably, a cutting process is performed in the size range of about 100 mm. Subsequently, the waste polyurethane foam thus cut is crushed to an average size of 2~4 mm using a primary coarse crusher. The coarse foam obtained using the primary coarse crusher is further crushed to an average size of 150~160 μm using a secondary coarse crusher, and is then recovered. In this case, the primary coarse crusher preferably includes a cutter mill provided with a 5 mm screen, and the secondary coarse crusher preferably includes a pin mill provided with a 0.8 mm screen.

The coarse foam thus recovered is loaded into a feeder, after which the coarse foam loaded into the feeder is finely ground to a size of 1~128 μm using a jet mill.

As such, before the coarse foam crushed using the secondary coarse crusher is loaded into the feeder for a subsequent process, it is preferred that such foam be further crushed using a ball mill. That is, the coarse foam, which is crushed using the secondary coarse crusher, is loaded into a ball mill to thus be further crushed, followed by loading the foam thus crushed into the feeder for a subsequent fine grinding process using a jet mill, thereby desirably obtaining finer powder.

Thereafter, the fine foam ground using a jet mill is loaded into a classifier, such that passed foam having a particle diameter of 1~45 μm passed through the classifier is finally packaged, and unpassed foam having a large particle diameter not passed therethrough is re-circulated upstream to thus be loaded again into the feeder in order to further undergo the crushing process and the classification process. In the classifier, the cutting point may be controlled so as to classify powder of foam having a desired particle diameter.

As such, the fine grinder, which plays an important role in the manufacture of the fine powder of waste polyurethane foam of the present invention, is chosen in consideration of the following conditions.

That is, a fine grinder should allow easy adjustment of the feed rate into the feeder (using a decelerator or a damper to control the introduction) and convenient recovery of the crushed material (possibility of recovering the products and exchanging a container even during crushing), and should also allow the foam to be ground to a particle diameter of 10 μm through the control of pressure and the feed rate, and a series of loading, grinding, and recovering the crushed material to be continuously performed. Further, since the crushing process is realized by the introduction of material having no water and passed through a filter using high pressure and collision of the material using high pressure, the insertion of impurities due to abrasion of a machine should be prevented. Furthermore, in the fine grinder, a feeding part, a grinding part and a discharge part, which are responsible for crushing in practice, should be formed of ceramic having high abrasion resistance so as to maximally inhibit the generation of impurities upon crushing. Moreover, after setting the conditions, automated operation should be achieved, and internal cleaning and maintenance of the machine should be easily conducted, and also, the generation of dust should be prevented upon crushing.

Figure 2:
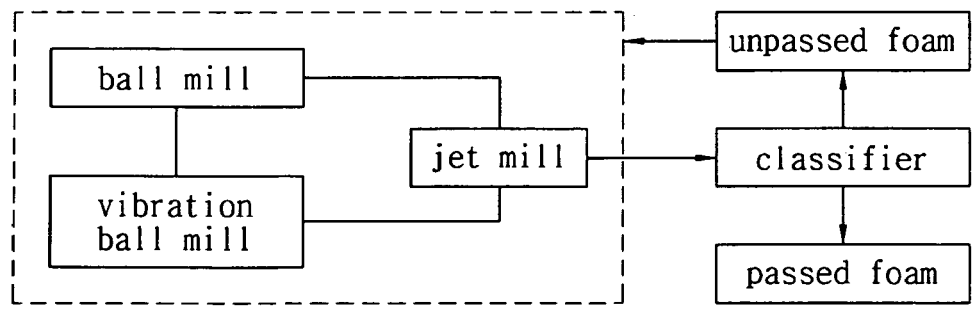
FIG. 2 schematically illustrates the crushing process and the classification process, according to the present invention.

In addition, since it is difficult to efficiently obtain fine powder through only the crushing process, a classification process should be closely connected with the crushing process. FIG. 2 schematically illustrates the crushing and classification processes. The classification process causes the unpassed foam, which is not passed through the classifier due to the large average particle diameter thereof, to be re-circulated into the fine grinding process, and the passed foam, which is passed therethrough, to be packaged. Therefore, the classification process is considered important because the total system efficiency is determined by the efficiency of the classifier.

The selection standards of the classifier and determination thereof are as follows.

Preferably, a dry classification process is adopted. Further, a classifier, capable of easily controlling a cutting point and a particle diameter, is selected. For large treatment, a classifier, capable of easily being scaled up, is selected. Furthermore, a classifier, which has strong force applied to a classification zone (i.e., efficient classification), uniform separability, and high agglomerate dispersibility, is selected. In order to increase classification efficiency, in particular, recovery efficiency, a classifier having a reusable classification unit in the classification zone is selected. Also, a classifier, allowing the classified fine powder to avoid being mixed with coarse powder and having the ability to stably supply and discharge the powder, is selected. In particular, since waste polyurethane foam has a low specific gravity, a classifier, in which the supply of such foam is sufficiently considered and which is closely connected with the crusher and can realize a closed circuit system, is selected.

Accordingly, an optimal classifier is selected depending on the above selection standards and the type of classifier of Table 1 below.

TABLE 1

| Type of Classification | Fluid Classifier | |
|---|---|---|
| | Range of Cutting Point | |
| Gravitational | 200~2000 μm | |
| Inertial | 10~250 μm | |
| Centrifugal | Free Vortex | 1~20 μm |
| | Semi-Free Vortex | |
| | Forced Vortex | 0.5~100 μm |

Based on the above selection standards, as an optimal classifier for finely powdering polyurethane foam in the present invention, a centrifugal classifier, in particular, a forced vortex classifier, is selected.

The principle of the forced vortex type classifier is as follows.

A material is fed into a rotor that is rotating in the upper portion of the classifier to thus be dispersed, and is then introduced into a classification zone. The air required for classification is sucked into a blower mounted in the downstream of the classifier, and is then introduced through the circumferential portion of a guide vane. Upon classification, the air flow rate accelerates to be suitable for classifying the component facing the center of the classifier using a rotor blade through a vortex.

The particles, which are supplied between the guide vane and the rotor blade, begin to swirl with such air flow. At this time, classification is realized by the balance between centrifugal force and drag force applied to the particles. Such balance causes the particles smaller than a predetermined particle diameter to be introduced into the rotor to be collected and discharged via a duct.

On the other hand, large particles are subjected to repeated classification in the classification zone to thus settle due to gravity, and the coarse powder is discharged from an outlet.

Further, the separate particles are controlled by the rotation speed of the rotor blade, that is, the centrifugal force to be applied to the particles. Also, since the classification limit of minimum particles is not affected by the size of the rotor, it is possible to easily realize upscaling.

Figure 3:
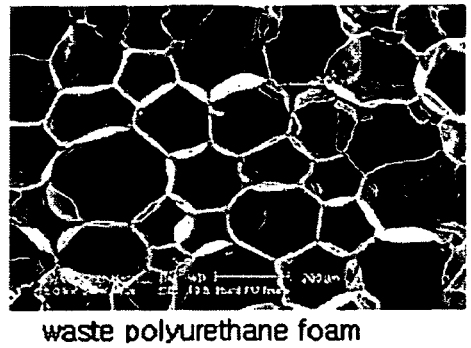
FIG. 3 illustrates the change in morphology of hard polyurethane foam during the crushing process according to the present invention, observed using an electron scanning microscope (SEM)
Figure 3:
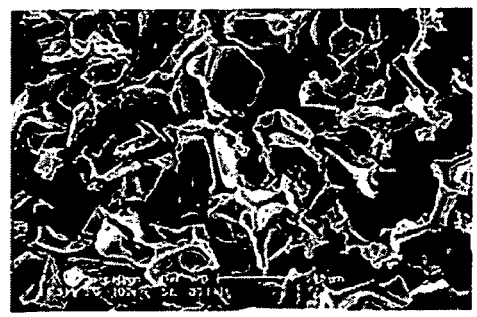
Figure 3:
Figure 3:
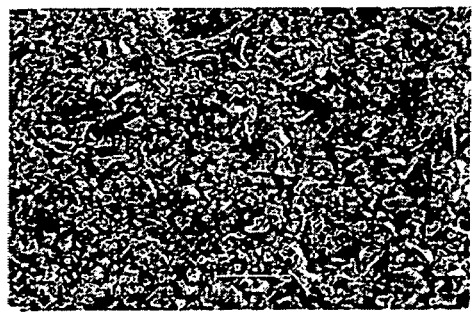
Figure 3:
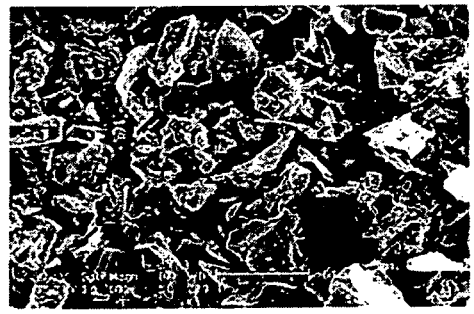
Figure 4:
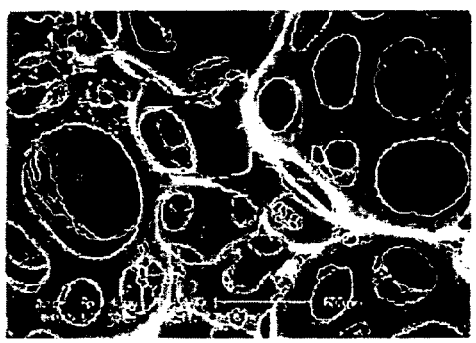
FIG. 4 illustrates the variation in the open cell structure with the amount of fine powder of waste hard polyurethane foam manufactured according to the present invention, observed using an SEM.
Figure 4:
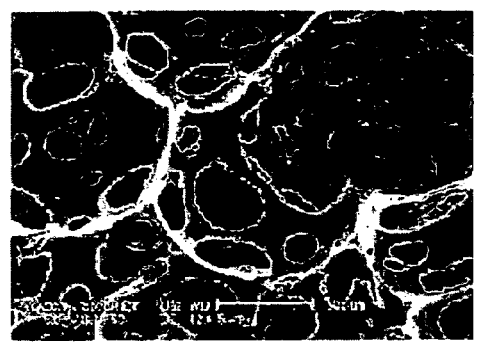
Figure 4:
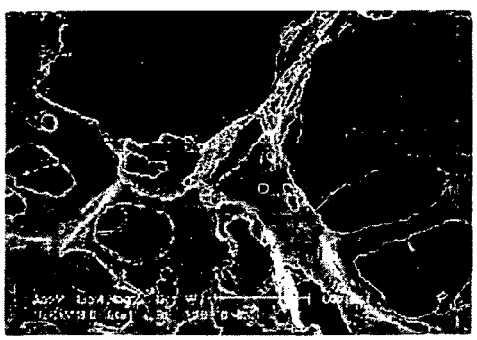
Figure 4:
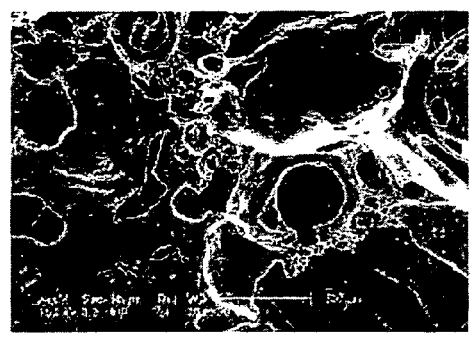

Generally, hard polyurethane foam has a closed cell structure. Referring to FIG. 3, which shows the change of morphology of powder of hard polyurethane foam during a crushing process, observed using an SEM, the closed cell structure can be seen to break due to the crushing process. In addition, fine powder (average particle diameter of 30 μm) of waste hard polyurethane foam, manufactured by the present invention, is mixed in varying the amounts of 5 wt %, 10 wt %, and 20 wt % with soft polyurethane foam as a virgin material, yielding a polyurethane foam mixture. The cell structure thereof is observed using an SEM, and is shown in FIG. 4. As is apparent from this drawing, when the hard polyurethane foam is contained in an amount of 5 wt %, it can be seen to have an open cell structure.

A better understanding of the present invention may be obtained through the following example, which is set forth to illustrate, but is not to be construed as the limit of the present invention.

EXAMPLE

In order to finely crush hard polyurethane foam, polyurethane foam was collected from waste panels, and was then cut to a size of 100 mm.

Figure 5:
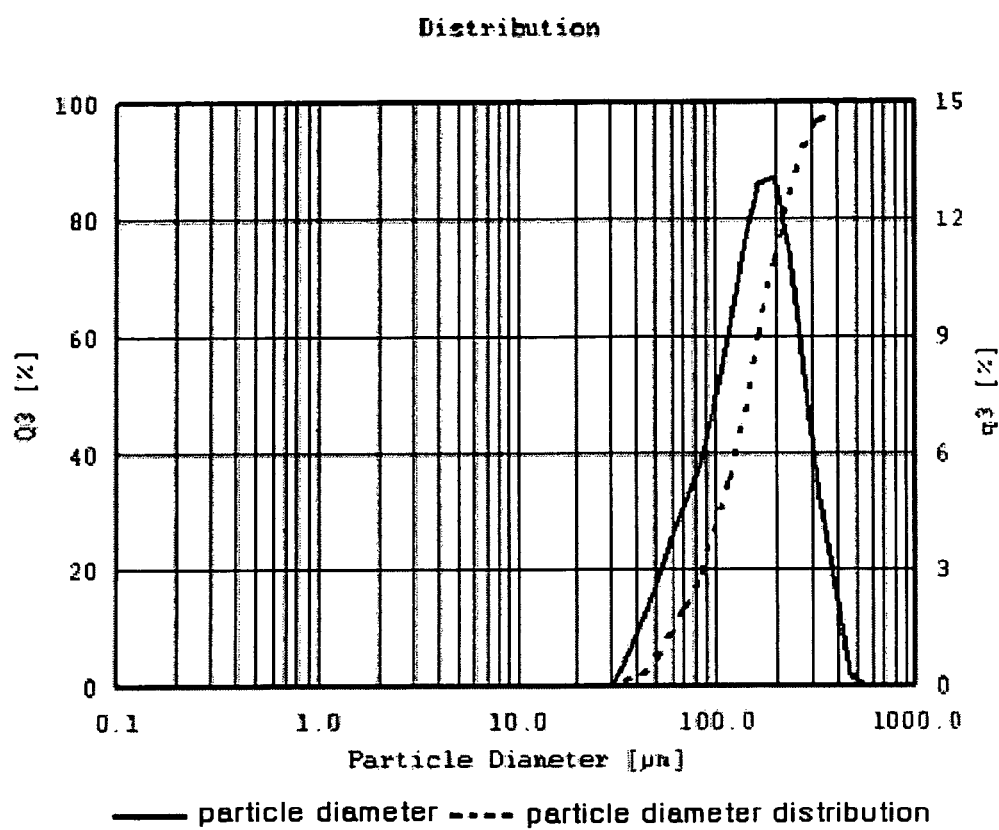
FIG. 5 illustrates the particle diameter distribution of the waste hard polyurethane foam after secondary coarse crushing, according to the present invention.

The cut polyurethane foam was crushed to an average size of 2~4 mm using a cutter mill provided with 5 mm screen as a primary coarse crusher, further crushed to an average size of 150~160 μm using a pin mill provided with 0.8 screen as a secondary coarse crusher, and was then collected. FIG. 5 shows the particle diameter distribution of the coarse foam after secondary coarse crushing, in particular, a curve of distribution of powder having an average particle diameter of 150 μm.

Figure 6:
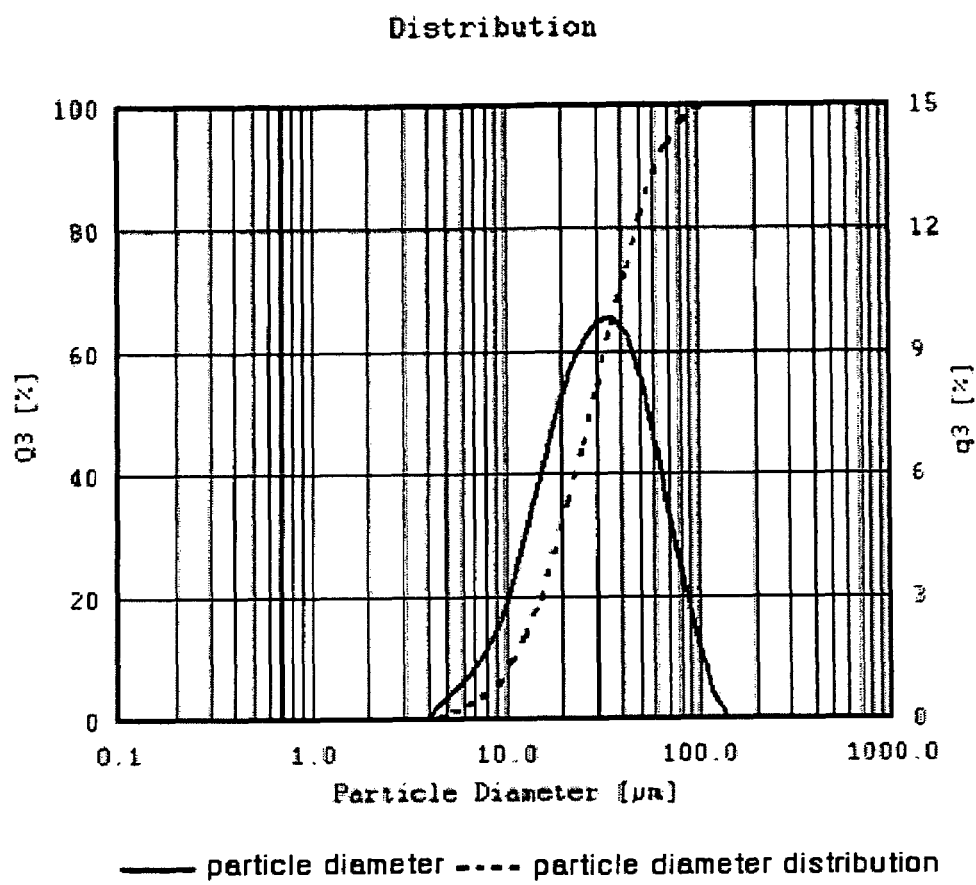
FIG. 6 illustrates the particle diameter distribution of the waste hard polyurethane foam after fine grinding using a jet mill, according to the present invention.

The coarse foam recovered after secondary coarse crushing was loaded into a feeder and was then crushed using a jet mill to thus obtain fine foam. As such, in the jet mill, the pushing pressure was 0.62 MPa, and the crushing pressure was 0.62 MPa. The particle diameter distribution of the fine foam is shown in FIG. 6. From this, it could be confirmed that the fine foam crushed using a jet mill had an average diameter of 30 μm and a maximum particle diameter of 128 μm, in which the powder having a particle diameter of 20~45 μm was contained in about 70%.

Then, the fine foam crushed using a jet mill was loaded into a classifier having a cutting point of 35~45 μm, such that the passed foam passed through the classifier was packaged while the unpassed foam having a large particle diameter which was not passed through the classifier was further crushed using a jet mill and loaded again into the classifier to thus pass it therethrough. In such a case, the passed foam passed through the classifier had a particle diameter of 3~45 μm and an average particle diameter of 23 μm.

<Measurement of Bulk Density>

TABLE 2

|  | Hard Foam after Primary Coarse Crushing | Hard Foam after Secondary Coarse Crushing | Hard Foam after Fine Grinding |
| --- | --- | --- | --- |
| Measuring Method | Injection Method | Injection Method | Injection Method |
| Capacity of Cell | 100 cc | 100 cc | 100 cc |
| Weight of Sample | 2.25 g | 3.35 g | 17.08 g |

TABLE 2-continued

|  | Hard Foam after Primary Coarse Crushing | Hard Foam after Secondary Coarse Crushing | Hard Foam after Fine Grinding |
| --- | --- | --- | --- |
| Bulk Density | 0.03 g/cc | 0.03 g/cc | 0.17 g/cc |
| Tap Density | 0.04 g/cc | 0.06 g/cc | 0.37 g/cc |

*used instrument: MT-100

<Measurement of True Density>

A true density (Pd) was measured using a liquid substitution process. As such, n-butanol was used as a solvent, and the used instrument was an auto denser MAT-7000. The true density of each of the primary coarse foam, the secondary coarse foam, and the fine foam crushed using a jet mill was calculated from Equation 1 below. The results are shown in Tables 3, 4 and 5 below. In Equation 1, Wa is the weight of the cell, Wb is the weight of the (cell+sample), Wc is the weight of the (cell+sample+medium), Wd is the weight of the liquid medium, Ld is the specific gravity of the solvent, and Pd is the true density of the sample.

$$Pd = \frac{Wb - Wa}{(Wb - Wa) - (Wc - Wd)} \times Ld \qquad \text{Equation 1}$$

TABLE 3

| Medium name | n-Butanol |
| --- | --- |
| Wait Time | 10 min |
| Vac. Time | 10 min |
| Vac. Press | 1 Torr |
| Medium Temp | 33.65° C. |
| Data | Wa = 20.4626 g |
|  | Wb = 20.6305 g |
|  | Wc = 59.2619 g |
|  | Wd = 59.2699 g |
|  | Ld = 0.7994 g/cc |
| True Density of Primary Coarse Foam | Pd = 0.8393 g/cc |

TABLE 4

| Medium name | n-Butanol |
| --- | --- |
| Wait Time | 10 min |
| Vac. Time | 10 min |
| Vac. Press | 1 Torr |
| Medium Temp | 27.05° C. |
| Data | Wa = 20.4621 g |
|  | Wb = 20.6474 g |
|  | Wc = 59.5937 g |
|  | Wd = 59.5137 g |
|  | Ld = 1.4153 g/cc |
| True Density of Secondary Coarse Foam | Pd = 1.4153 g/cc |

TABLE 5

| Medium name | n-Butanol |
| --- | --- |
| Wait Time | 10 min |
| Vac. Time | 10 min |
| Vac. Press | 1 Torr |
| Medium Temp | 31.69° C. |
| Data | Wa = 20.4647 g |
|  | Wb = 20.1518 g |
|  | Wc = 59.6088 g |
|  | Wd = 59.3505 g |
|  | Ld = 1.2833 g/cc |
| True Density of Fine Foam | Pd = 1.2833 g/cc |

As is apparent from Tables 3, 4 and 5, the true density of the foam could be seen to increase as the number of crushing process increased.

<Measurement of Properties of Urethane Mixture>

The fine powder of waste hard polyurethane foam manufactured by the present invention was mixed in varying amounts of 5 wt %, 10 wt %, and 20 wt % with soft polyurethane foam as a virgin material, to thus prepare a polyurethane foam mixture, and the properties thereof were measured. The results are shown in Table 6 below.

TABLE 6

|  | Amount of Fine Powder of Waste hard Polyurethane Foam | | | |
| --- | --- | --- | --- | --- |
|  | 0 wt % | 5 wt % | 10 wt % | 20 wt % |
| Density of Core (kg/m$^3$) | 46.1 | 50.9 | 52.3 | 50.1 |
| Elongation (%) | 86.4 | 50.3 | 49.7 | 29.0 |
| Tensile Strength (kg/cm$^2$) | 1.072 | 0.664 | 0.651 | 0.382 |
| Tear Strength (kg/cm$^2$) | 0.611 | 0.372 | 0.338 | 0.288 |
| Dimensional Stability (%) | −5.832 | −6.132 | −7.149 | −9.139 |

As is apparent from Table 6, even though the amount of fine powder of waste hard polyurethane foam manufactured by the present invention was increased, the core density was only slightly changed. Further, elongation, tensile strength, tear strength, and dimensional stability were only slightly deteriorated.

As described hereinbefore, the present invention provides fine powder of waste polyurethane foam and a manufacturing method thereof. According to the present invention, in a technique for physically powdering waste polyurethane among various waste polyurethane recycling techniques, a crushing process including primary and secondary coarse crushing steps and a fine grinding step and a classification process are applied to thus manufacture fine powder of waste polyurethane foam. Thereby, conventional problems, in which the properties are deteriorated and the desired cell structure is not formed, due to the use of waste polyurethane foam, which has a large particle diameter, can be solved. Moreover, the recycling range of waste polyurethane can be widened and environmentally friendly properties can be exhibited because resources are recycled and environmental contamination is prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing fine powder of waste polyurethane foam, comprising the steps of:
    a) crushing waste polyurethane foam to an average size of 2 to 4 mm using a primary coarse crusher and then to an average size of 150 to 160 μm using a secondary coarse crusher;
    b) crushing the foam obtained in the step a) using a ball mill;
    c) loading the foam obtained in the step b) into a feeder and grinding the loaded foam to a size of 1 to 128 μm using a jet mill; and
    d) loading the foam obtained in the step c) into a forced vortex centrifugal classifier, and then packing the foam having a particle diameter of 1 to 45 μm and passing through the classifier and re-loading the foam, which has a large particle diameter and does not pass through the classifier, into the feeder.

2. The method as set forth in claim 1, wherein the primary coarse crusher is a cutter mill provided with a 5 mm screen.

3. The method as set forth in claim 1, wherein the secondary coarse crusher is a pin mill provided with a 0.8 mm screen.

4. The method as set forth in claim 1, wherein the classifier has a cutting point set to a range of 10 to 45 μm.

* * * * *